(12) United States Patent
de Bonet (10) Patent No.: US 7,168,008 B2
(45) Date of Patent: Jan. 23, 2007

(54) METHOD AND SYSTEM FOR ISOLATING AND PROTECTING SOFTWARE COMPONENTS

(75) Inventor: Jeremy S. de Bonet, North Andover, MA (US)

(73) Assignee: MobiTV, Inc., Emeryville, CA (US)

( * ) Notice: Subject to any disclaimer, the term of this patent is extended or adjusted under 35 U.S.C. 154(b) by 611 days.

(21) Appl. No.: 10/347,138

(22) Filed: Jan. 17, 2003

(65) Prior Publication Data

US 2003/0145253 A1    Jul. 31, 2003

Related U.S. Application Data

(60) Provisional application No. 60/349,632, filed on Jan. 18, 2002, provisional application No. 60/349,424, filed on Jan. 18, 2002, provisional application No. 60/349,344, filed on Jan. 18, 2002.

(51) Int. Cl.
*G06F 11/00* (2006.01)
(52) U.S. Cl. ......................................... 714/38
(58) Field of Classification Search ................ 714/15, 714/38
See application file for complete search history.

(56) References Cited

U.S. PATENT DOCUMENTS

| | | | | |
|---|---|---|---|---|
| 3,551,659 | A | * | 12/1970 | Forsythe ...................... 714/38 |
| 4,933,940 | A | * | 6/1990 | Walter et al. .................. 714/10 |
| 5,040,178 | A | * | 8/1991 | Lindsay et al. ............. 714/722 |
| 5,410,703 | A | * | 4/1995 | Nilsson et al. .............. 717/168 |
| 5,497,434 | A | | 3/1996 | Wilson |
| 5,511,164 | A | * | 4/1996 | Brunmeier et al. ........... 714/53 |
| 5,590,277 | A | * | 12/1996 | Fuchs et al. .................. 714/38 |
| 5,630,047 | A | * | 5/1997 | Wang .......................... 714/15 |
| 5,712,971 | A | * | 1/1998 | Stanfill et al. ................ 714/34 |
| 5,748,882 | A | | 5/1998 | Huang |
| 5,751,939 | A | * | 5/1998 | Stiffler ......................... 714/15 |
| 5,815,702 | A | * | 9/1998 | Kannan et al. ............. 712/244 |

(Continued)

FOREIGN PATENT DOCUMENTS

EP    0 965 923 A2    12/1999

(Continued)

OTHER PUBLICATIONS

Rafnel, B.A., "A Transaction Approach to Error Handling" Hewlett-Packard Journal, vol. 44, No. 3, Jun. 1, 1993, pp. 71-77.*

(Continued)

*Primary Examiner*—Bryce P. Bonzo
(74) *Attorney, Agent, or Firm*—Sprinkle IP Law Group (57) ABSTRACT

A system and method for protecting software components of a software system can be used to guard against faults which might occur during the execution of a software component. A software component which is particularly prone to faults may be designated for protection. Faults occurring during execution of these protected software components can be detected, execution of the protected software component can be halted, and the software system may be restored to the state it held before execution of the protected software component commenced. The software system can then resume executing in a normal manner. Furthermore, a default value for the protected software component may be assigned in the event that a fault is detected during execution of the protected software component.

43 Claims, 3 Drawing Sheets

U.S. PATENT DOCUMENTS

| | | | |
|---|---|---|---|
| 5,825,917 A | | 10/1998 | Suzuki |
| 5,870,607 A | * | 2/1999 | Netzer ......................... 717/127 |
| 5,948,112 A | * | 9/1999 | Shimada et al. .............. 714/16 |
| 6,005,979 A | | 12/1999 | Chang et al. |
| 6,009,192 A | | 12/1999 | Klassen et al. |
| 6,105,148 A | * | 8/2000 | Chung et al. .................. 714/16 |
| 6,282,701 B1 | * | 8/2001 | Wygodny et al. ........... 717/125 |
| 6,430,703 B1 | * | 8/2002 | Connor et al. ................. 714/20 |

FOREIGN PATENT DOCUMENTS

| | | |
|---|---|---|
| GB | 1 509 193 | 5/1978 |

OTHER PUBLICATIONS

Tai, A.T et al., "On Low-Cost Error Containment and Recovery Methods for Guarded Software Upgrading" Proceedings of the 20th International Conference on Distributed Computing System (ISCDS 2000), Taipei, Taiwan, Apr. 2000, pp. 1-8.*

International Search Report for International Application No. PCT/US03/01526, Aug. 26, 2004.

Rafnel, B.A., "A Transaction Approach to Error Handling," Hewlett-Packard Journal, vol. 44, No. 3, Jun. 1, 1993, pp. 71-77.

Randel, B., "Reliability Issues in Computing System Design," Computing Surveys, vol. 10, No. 2, Jun. 2, 1978, pp. 123-165.

International Search Report for PCT/US02/28994, Dec. 4, 2002.

Robert W. Floyd & Louis Steinberg, "*An adaptive algorithm for spatial gray scale*" SID 75 Digest: 36-37, 1975.

Paul Heckbert, "*Color image quantization for frame buffer display*" Computer Graphics, 16(3):297-307, Jul. 1982.

C. E. Shannon, "*A mathematical theory of communication*" The Bell System Technical Journal, 27(3): 379-423, Jul. 1948.

C. E. Shannon, "*A mathematical theory of communication, Part III.*" The Bell System Technical Journal, pp. 623-656, Jul. 1948.

T. A. Welch, "*A technique for high-performance data compression*" Computer, 17(6): 8-19, Jun. 1984.

Jacob Ziv, "*Coding theorems for individual sequences*" IEEE Transactions on Information Theory, 24(4): 405-412, Jul. 1978.

Jacob Ziv & Abraham Lempel, "*A universal algorithm for sequential data compression*" IEEE Transactions on Information Theory, 24(3): 337-343, May 1977.

Jacob Ziv & Abraham Lempel, "*Compression of individual sequences via variable-rate coding*" IEEE Transactions on Information Theory, 24(5): 530-536, Sep. 1978.

Thompson and Manola, "Component Software Glossary", Object Services and Consulting, Inc., pp. 1-23, 1996.

Patino-Martinez, et al., Bridging the Gap between Hardware and Software Fault Tolerance (2002), http://citeseer.ist.psu.edu/patino-martinez02bridging.html.

* cited by examiner

METHOD AND SYSTEM FOR ISOLATING AND PROTECTING SOFTWARE COMPONENTS

RELATED APPLICATIONS

This application claims priority under 35 U.S.C. § 119(e) to U.S. Provisional Patent Application No. 60/349,632, entitled "Method and System for Isolating and Protecting Software Components to Increase Reliability and Prevent Inadvertent Corruption" by de Bonet, filed on Jan. 18, 2002, U.S. Provisional Patent Application No. 60/349,424, entitled "Network Proxy Platform that Simultaneously Supports Data Transformation, Storage, and Manipulation for Multiple Protocols" by de Bonet et al., filed on Jan. 18, 2002, and U.S. Provisional Patent Application No. 60/349,344, entitled "A Modular Plug-In Transaction Processing Architecture" by de Bonet et al., filed Jan. 18, 2002, which are hereby fully incorporated by reference herein. Additionally, this application relates to U.S. Patent Application Ser. No. 10/342,113 entitled "Method and System of Performing Transactions Using Shared Resources and Different Applications," by de Bonet et al., filed Jan. 14, 2003, which is incorporated by reference herein.

TECHNICAL FIELD OF THE INVENTION

This invention relates in general to reducing the likelihood of inadvertent failures of software systems, and more particularly, to protecting software systems against inadvertent failures, errors, and system crashes by isolating and protecting software components within those software systems.

DESCRIPTION OF THE RELATED ART

Computer programs and software projects can be long and complicated structures, often developed not by a sole programmer, nor even a team of programmers, but many times by programmers from multiple groups, or in some cases from different companies.

Almost inevitably these programmers write defects into their code. This problem becomes exacerbated in relation to the number of programmers working on any particular software system. Typically, the more programmers working on a software system, the higher the frequency with which defects are introduced into the code making up that system. Frequently, these defects within individually developed software components can have a catastrophic impact on the running system as a whole.

Prior attempts at solving the defect problem simply utilized a higher level programming language to develop these software systems. Languages such as Java, Pascal, BASIC, and LISP substantially prevent system failures by excluding functionality, making certain operations which could cause an error or system crash nearly an impossibility to perform.

The approach taken by these high-level languages, however, has significant downsides. One downside is that the flexibility of the programming language itself is reduced. For example, a low-level, highly efficient language like C or C++ allows direct manipulation of pointers and memory structures while a higher-level language, such as Java, allows no such manipulation. A key corollary of this lack of functionality can be a loss of performance in higher-level languages due to these languages' need to check the internal validity of these types of operations.

Conversely, lower-level languages, such as C or C++, can be prone to crashing problems. Consequently, there is a need to give low-level, efficient programming languages some of the protective characteristics of higher-level languages while simultaneously retaining their speed and performance.

SUMMARY OF THE INVENTION

Embodiments of the present invention can provide a system and method for detecting and remedying an illegal operation or other fault in a software system that reduce or eliminate the disadvantages associated with previously-developed protection systems. In many embodiments, these systems and methods can involve executing a previously designated software component of a software system, detecting whether a fault occurred during execution of the component, and restoring the software system to the state it was in before execution of the software component if a fault is detected.

In one embodiment, faults may be of the type that would cause a system crash or system corruption.

In another embodiment, system functions can be used to catch illegal or other operations which are indicative of faults within the protected software component.

Regarding system or memory corruption, a memory pattern may be created, allowing the detection of faults resulting from "out of bounds" memory accesses.

In still another set of embodiments, a system function can be used to save a state of the software system before execution of a protected software component and return to this state if a fault is detected within the protected software component.

These and other aspects of the invention will be better appreciated and understood when considered in conjunction with the following description and the accompanying drawings. However, though the following description indicates various embodiments of the invention and numerous specific details thereof, it should be understood as given by way of illustration and not of limitation. Many substitutions, modifications, additions and rearrangements may be made within the scope of the invention, and the invention includes all such substitutions, modifications, additions and rearrangements.

BRIEF DESCRIPTION OF THE DRAWINGS

The drawings accompanying and forming part of this specification are included to depict certain aspects of the invention. A clearer understanding of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. Note that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. The detailed description and the specific examples, while indicating preferred embodiments of the invention, are given by way of illustration only and not by way of limitation. After reading the specification, various substitutions, modifications, additions and rearrangements will become apparent to those skilled in the art from this disclosure which do not depart from the scope of the appended claims.

Embodiments of the present invention provide a system and method for protecting software systems from failure. Typically, a component of a software system which has a potential to be faulty, or if a fault could cause a catastrophic failure to the program, is singled out for protection. If a fault occurs during the execution of this particular component, the fault can be identified, corrective measures can be taken, and the software system can resume execution as if the component did not exist. Certain embodiments of the invention protect against a signal issued by the Central Processing Unit ("CPU") which would otherwise cause the software system to fail. Other embodiments protect against memory operations which may not have caused the system to crash, but would have nonetheless corrupted the memory system of the computer. Still other embodiments protect against faults which cause a portion of the software system to execute for longer than a pre-determined period. Moreover, once these types of errors are detected, corrective measures can be taken, and execution of the software system can resume as though no error occurred in the protected code.

Additionally, the actions to be taken if a fault is detected during the execution of the protected code block can be defined. For example, in the event of a fault, the protection mechanism may emulate a return value for the faulty software component. This allows the remainder of the software system to act as if no fault occurred and the faulty component returned a valid value.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "software component" is intended to mean at least a portion of a computer program (i.e., a software application), or software system. An example includes a software module as used in object-oriented programming. Different software components may reside in the same computer program or in different software systems on the same computer or different computers.

Figure 1:
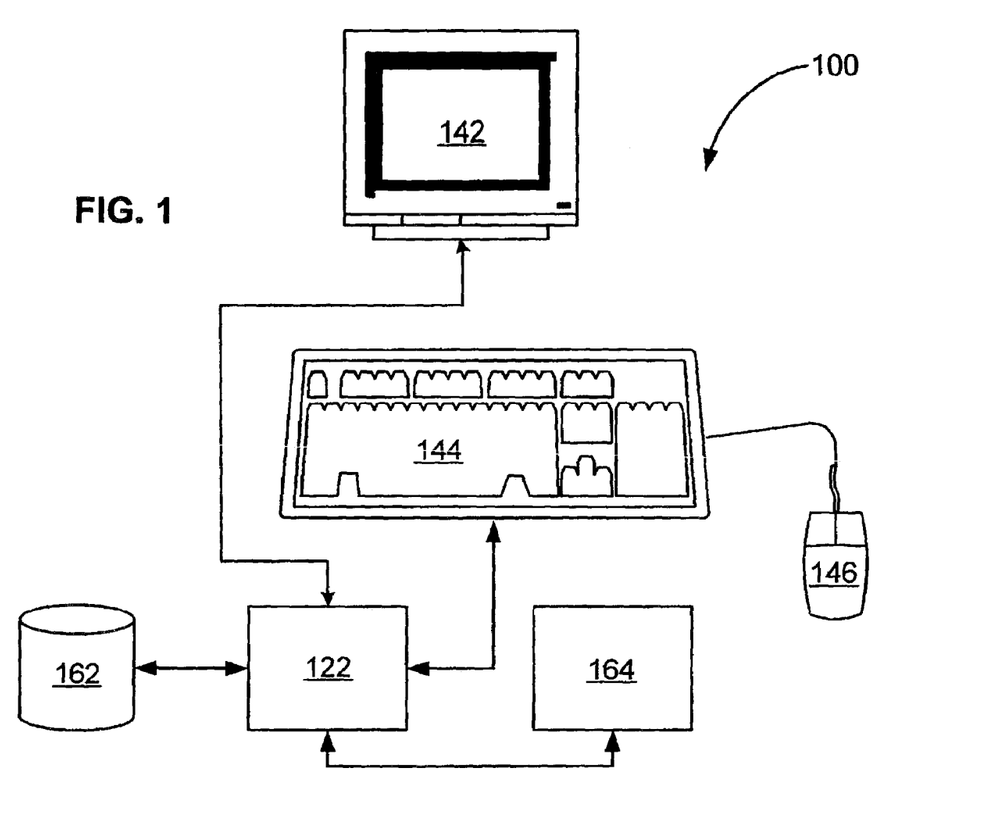
FIG. 1 includes an illustration of a computer system for use with the systems and methods described herein.

Before discussing embodiments of the present invention, an exemplary hardware architecture for using embodiments of the present invention is described. FIG. 1 illustrates such an exemplary hardware architecture and includes computer system 100 comprising CPU 122. CPU 122 may comprise read-only memory ("ROM"), random access memory ("RAM"), or other types of volatile or non-volatile memory. CPU 122 is bi-directionally coupled to monitor 142, keyboard 144, hard disk ("HD") 162, and printer 164. An electronic pointing device, such as mouse 146, may be coupled to CPU 122 directly (not shown) or via keyboard 144. Other electronic pointing devices can include a trackball, stylus, or the like and may replace or be used in conjunction with mouse 146.

Note that FIG. 1 is a simplification of an exemplary hardware configuration. Computer system 100 may have more than one of the hardware components shown in FIG. 1. In addition, other peripheral devices (not shown) may be coupled to CPU 120 or other portion(s) of the computer system 100. Many other alternative hardware configurations are possible and known to skilled artisans.

CPU 122 is an example of a data processing system. HD 162, ROM, RAM, and other memories can include media that can be read by the CPU 122. Therefore, each of these types of memories includes a data processing system readable medium.

Figure 2:
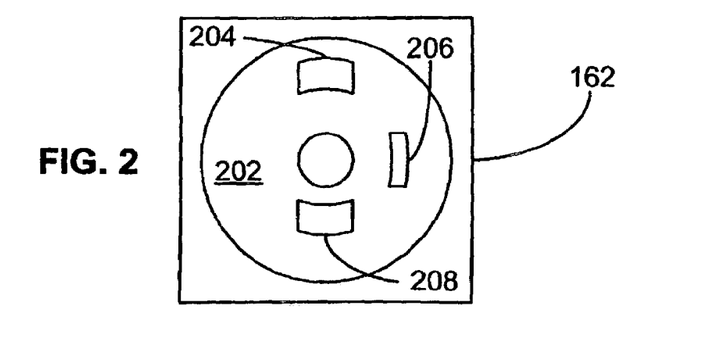
FIG. 2 includes an illustration of a computer system storage medium including software code having instructions in accordance with an embodiment described herein.

Portions of the methods described herein may be implemented in suitable software code that may reside within HD 162, ROM, RAM, or other memory. The instructions in an embodiment of the present invention may be contained on HD 162 or other memory. FIG. 2 illustrates a combination of software code elements 204, 206, and 208 that are embodied within a data processing system readable medium 202 on HD 162. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of assembly code, compiled C, C++, Java, or other language code. Other architectures may be used. A computer program or its software components with such code may be embodied in more than one data processing system readable medium in more than one computer.

Communications using computer system 100 in FIG. 1 can be accomplished using electronic, optical, radio-frequency, or other signals. For example, when a user is at computer system 100, CPU 122 may convert the signals to a human understandable form when sending a communication to the user and may convert input from the user to appropriate electronic, optical, radio-frequency, or other signals to be used by, other computer systems (not shown).

Figures 3, 5:
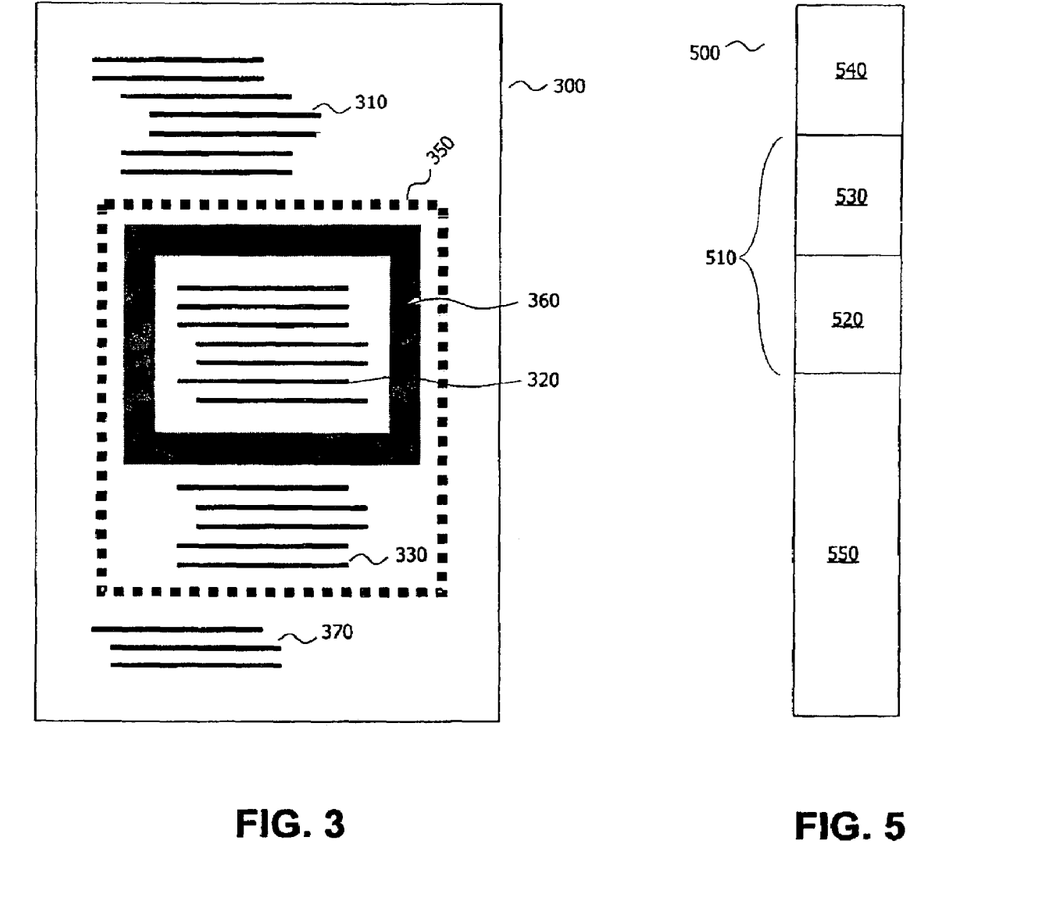
FIG. 3 includes a graphical depiction of one embodiment of the system of the present invention.
FIG. 5 includes a depiction of an embodiment of the present invention which uses a memory to detect faults within a protected software component.

Turning now to FIG. 3, a graphical representation of one embodiment of the present invention is depicted. A computer program or software system 300 may comprise many lines of source code, usually grouped into functional blocks shown as software components 310, 320, and 370. This code is usually written in one of the commonly known and utilized programming languages such as C, C++, Fortran, etc., or in less common cases, even lower-level languages such as machine or assembly code. Because of their size and complexity a software system 300 often cannot be developed by one person, and a team or group of teams may be delegated to work on a software system 300. Frequently, any or all software components 310, 320, and 370 within the software system 300 can be developed by different groups.

The development process of software system 300, combined with the power of many programming languages, leads to the incorporation of programming defects into any or all of the various software components 310, 320, and 370 which make up the software system 300. These defects may cause the software system 300 to crash during execution. For example, a software component 310, 320, or 370 may cause a segmentation violation, attempt to divide a number by zero, put the software system into an infinite loop, or the like. Additionally, in certain cases these defects may not cause the software system 300 to crash, but instead, may cause the software system 300 to function improperly. For example, data residing in memory may be inadvertently overwritten by a software component 310, 320, or 370, or a software component 310, 320, or 370 may execute in an infinite loop, tantamount to halting execution of software system 300.

In order to remedy the detrimental effects of defects on the software system 300, an embodiment of the present invention allows a software component 320 which may need to be tested for faults to be designated as protected within block 350. During execution of the software system 300, a software component 320 may be called any number of times by other software components 310 or 370 contained in the software system 300. Protective code layer 360 may designate a software component 320 as protected and save a state of a software system 300 before execution of a software component 320, and furthermore may associate a remedial software component 330 to be executed if a fault is detected within a software component 320. The software component 320 is then executed.

If no faults occur during execution of the protected software component 320, the software system 300 may skip execution of any remedial code 330 associated with the protected software component 320 by protective code layer 360, and the software system 300 may continue running normally starting with software component 370.

However, if a fault occurs during execution of a protected software component 320 which would normally crash the computer system on which software system 300 is executing, or which would impair the proper functioning of the software system 300, the protective code layer 360 can detect this error.

Upon detection of a fault in the protected software component 320, the protective code layer 360 may immediately terminate the execution of the protected software component 320. In one embodiment of the present invention, after execution of the protected software component 320 is halted, a designated software component 330 is executed which may take remedial action based on the fault detected.

In most cases, after execution of the protected software component 320 is halted by the protective code layer 360, the software system 300 may be returned to the state it held before execution of the protected software component 320. Restoring the state of the software system 300 is accomplished by the protective code layer 360. Before execution of the protected software component 320, the protective code layer 360 saves a copy of the state of the software system 300. If a fault is detected by the protective code layer 360 during execution of the protected software component 320, the protective code layer 360 restores the software system 300 to this pre-execution saved state. After the software system 300 is restored to the pre-execution state, normal execution of the software system 300 may continue 370.

Figure 4:
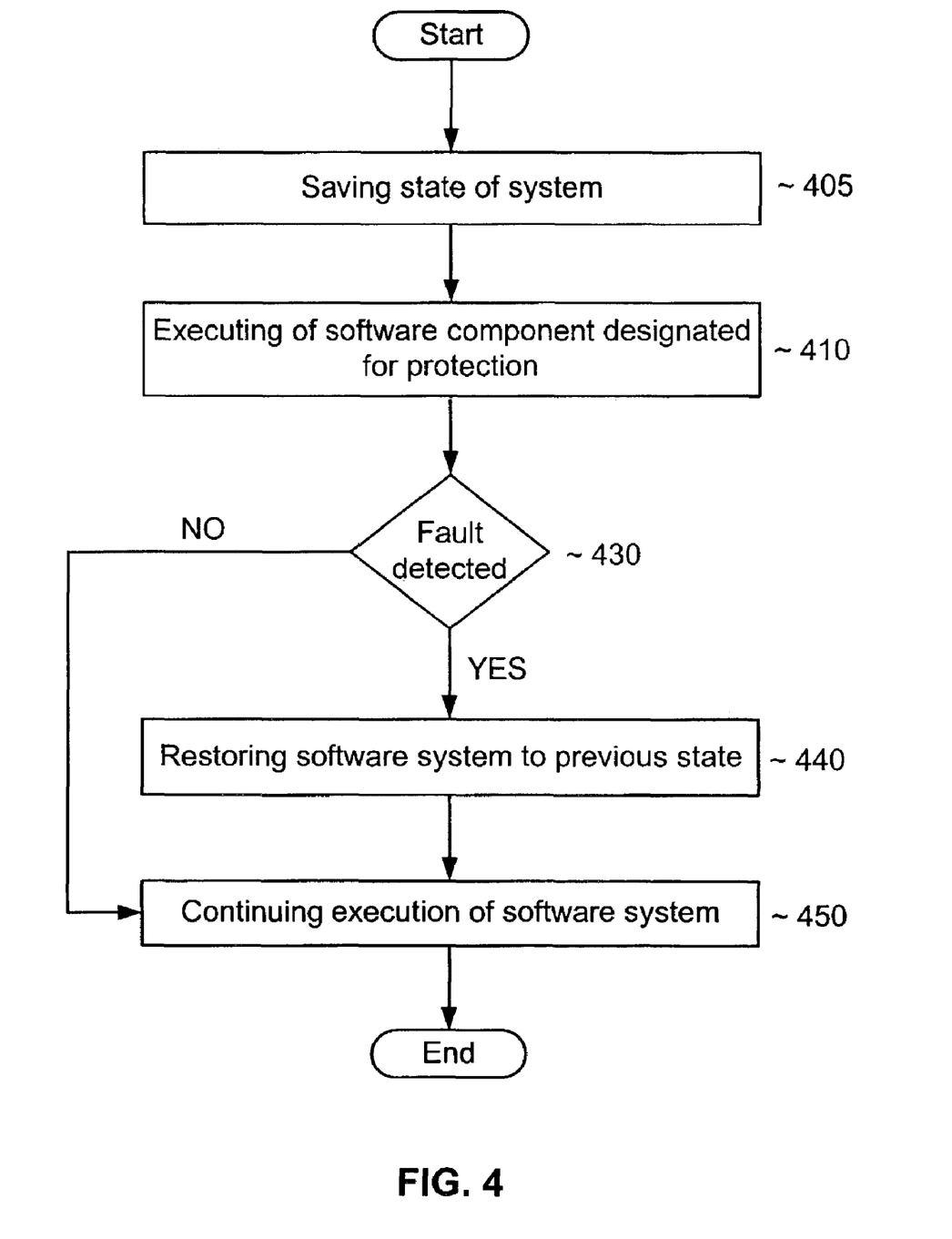
FIG. 4 includes a flow diagram illustrating one embodiment of the present invention.

FIG. 4 depicts a flow diagram of one method in accordance with an embodiment of the present invention, including: saving the state of a software system 405; executing a software component which was previously designated for protection 410; determining if a fault occurred during execution of the software component 430; restoring the system to the previously saved state if a fault was detected 440; and continuing execution of the software system 450.

Large software systems are usually composed of many discrete software components which may perform a variety of functions within the software system. Some of these software components may be more prone to errors than others. For example, in a software system comprising code in assembly code or the C or C++ programming languages, software components which allocate memory, or utilize and manipulate pointers to memory are more prone to causing faults which may corrupt data needed by the software system. In certain cases a software component in any of those languages may cause a fault that could result in the crash of the software system or the machine on which the software system is executing. Embodiments of the present invention involve designating these dangerous software components for protection.

One method of the present invention may include the optional act of designating a software component 320 for protection. Designating a software component 320 within a software system 300 for protection may involve surrounding the software component 320 to be protected with extra code intended to be run before the protected software component 320 is executed. This protective code may save the state of the software system 300 and, in the event a fault is detected, associate code 330, which may also be a software component, to take remedial action to account for the fault detected within the protected software component 320. This protective code layer 360 may be embodied in a programming library, and a macro utilizing this programming library may be inserted into the software system 300 to designate which software component 320 is to be protected through the use of this library.

Before execution of the protected software component 320 the state of the software system is saved 405 to insure that if an error is detected during execution of protected software component 320, the software system can revert back to a former state. The entire state of an executing software system may be contained in certain elements of a computer system. Most often, this state is embodied in the local memory stack, the function pointer stack, and the program counter. By saving these elements, the state of a software system at any point in its execution may be retained.

Prior to execution of the protected software component 320, a copy of the current state of the software system is made 405. In other words, copies of the local memory stack, the function pointer stack, and the program counter are created. Typically, these copies are made using the standard C++ system function call "setjmp."

During execution of the software system, this protected software component 320 has the potential to be called many times by other software components 310 or 370 contained in the software system 320.

The method of the present invention can also comprise executing the protected software component 410. After executing a software component designated for protection 410 has commenced, the method can further comprise determining if a fault is detected. For the most part, faults detected 430 during the execution of a protected software component can be divided into three main categories. Faults which would cause the software system, or the machine on which the software system is executing, to crash, software components whose execution time is too long, and those faults which might not cause a crash but which may nonetheless cause corruption of data needed for the software system to function properly may be detected. Many embodiments of the present invention protect software systems against these types of faults.

In order to detect faults 430 during execution of a the CPU of the machine on which the software system 300 is executing are monitored. A software component is basically a series of instructions to be executed on a CPU. During execution of these instructions presented to the CPU by a software component, the CPU generates signals in response to certain events. A subset of these signals generated by the CPU indicate that a critical fault has occurred, and a system crash is imminent. For example, on a standard UNIX, SUN Solaris, or Microsoft Windows based system, if a segmentation violation occurs the CPU will issue a SIG_SEGV signal before crashing. Alternatively, if a floating point error occurs the CPU will issue a SIG_SPG signal before crashing, or if an illegal instruction is encountered, the CPU will issue a SIG_ILL signal before crashing.

Many embodiments of the present invention may detect faults 430 which occur during the execution of a protected software component 320 by monitoring the signals issued by the CPU in response to the instructions presented by a protected software component 320. Typically, this detection is done with the C or C++ function "signal," which allows signals issued by the CPU indicating a looming system crash to be caught and handled before the impending crash of the software system occurs.

Faults caused by overlong execution time of a protected software component 320 may also be detected by embodiments of the present invention. These types of faults are typically caused by code within the protected software component 320 which places the software system into an infinite loop, or causes portions of code to execute for an unusually long time. Certain embodiments of the present invention detect a fault of this type by comparing the time taken to execute protected software component 320 with a predetermined time period.

Another type of fault which may be detected are those faults which may not cause a crash of the software system, but which would nevertheless disrupt the functioning of the software system by corrupting data needed by the software system to execute properly. These faults typically occur when memory access occurs. For example, illegal instructions overwriting memory to which the software component is not assigned.

Turning briefly to FIG. 5, the method by which many embodiments of the present invention detect these types of memory faults is depicted. In one embodiment, memory 500 is divided into pages 510, 540, and 550, the size of which is determined on a computer system by computer system basis. A software component 320 has access only to those memory pages 510 that are assigned to that software component 320. Often times, however, a software component 320 utilizes less memory than is contained in a given page size. In this case, a software component 320 may have access to read and write to memory contained in an entire page 510, though only a portion 520 of that page's memory may be actually assigned to that software component 320. If software component 320 reads or writes portion 530, this can be detected as a fault. By reading or writing to portion 530 a software component 320 may corrupt data needed by other components of the software system 300 by writing to memory not assigned to it, yet contained in a memory page to which software component 320 has access. Conversely, a protected software component 320 may store required data in an area of memory to which it is not assigned. At a later point, this data may be overwritten by another software component assigned to that portion of memory, causing a loss of data needed by the protected software component 320.

To catch faults of this type, many embodiments of the present invention employ the technique depicted in FIG. 5. Each page of memory 510 to which the protected software component 320 has access can be divided into areas to which the protected software component 320 is assigned 520 and those areas to which it is not assigned 530. The areas of memory page 510 to which the protected software component 320 is not assigned 530 is filled with a particular pattern of bits before execution of the protected software component 320. After the protected software component 320 finishes execution, this pattern in area 530 may be verified. If the protected software component 320 has changed memory in area 530, the change can be detected through a comparison of the patterns existing in memory area 530 before and after execution of the protected software component.

Returning now to FIG. 4, if a fault which would cause a crash, which would corrupt memory, or which would cause software component to execute longer than a determined time period is detected 430, many embodiments of the present invention respond by restoring the software system 300 to a previous state 440.

As noted above, before execution of the protected software component 320 copies of the local memory stack, the function pointer stack, and the program counter are created. During execution of the protected software component 320, the local memory stack, the function pointer stack, and the program counter are modified freely. When a fault is detected 430, either by use of a CPU signal, or through a comparison of the patterns in memory, the state of the software system 300 usually must be restored to the state extant before execution of the protected software component commenced.

Usually this restoration is accomplished through the use of the standard C++ system function call "lngjmp". This function disposes of the local memory stack, function pointer stack, and program counter currently in use by the software system, and replaces them with the copies made by the C++ function "setjmp" before execution of the protected software component 405. This serves to return the software system to the state existing before execution of the protected software component began.

Employing these techniques additionally allows various embodiments of the present invention to protect software components in a multi-thread environment, and, for protected software components to call or contain other protected software components, known as nesting in common parlance. A stack of states can be maintained for every thread currently executing in a software system. When a protected software component is called, a copy of the current state is made, usually using "setjmp," and this copy is pushed on the stack of states associated with the thread calling the protected software component. If a fault is detected during execution of the protected software component, the stack being currently utilized is disposed of, the saved state is popped off the top of the stack of saved states for that thread, usually using "lngjmp," and the state existing before execution of the protected software component is restored. However, if no faults are detected during execution of the protected software component, the copy of the state saved on top of the stack of states is discarded.

Utilizing a stack of states coupled with the disposition of the saved states when a protected software component executes without fault also allows nesting of protected functions to be done with less overhead. If a software system contains a nested protected software component, during execution many states will be pushed on the stack of states. Disposing of each saved state with the successful completion of each protected software component allows the retained state associated with the currently executing software component to always reside at the top of the stack of saved states. One specific embodiment of the present invention can be described as:

```
// this global structure keeps, independently for each thread,
// a stack of continuations
global AssociativeArray<ThreadID, StackOf<Continuations> >
continuations;
macro ProtectCode(code_to_protect, code_on_failure)
{
    // capture signals generated by the CPU or Kernel
    // when it detects certain illegal actions
    HandleSignal (SIG_FPE,
CorruptionOccurred);
    HandleSignal(SIG_SEG, CorruptionOccurred);
    HandleSignal(SIG_ILL, CorruptionOccurred);
    // build a pattern to check for memory on the stack which
    // is too close to legal memory for the CPU to catch
    // overwrites.
    // (i.e. illegal memory within the same page as legal
    // memory)
    Byte sandbox[SANDBOX_SIZE];
    FillSandboxWithPattern(sandbox);
    // push this continuation point onto the stack
    Continuation cont=GetContinuation( );
    ThreadID tid=GetThreadID( );
    continuations.Get(tid).Push(cont);
    // (***) This is the critical continuation point
    //
    // If we are here for the first time, then
    // continuation_called
    // will be false.
    //
    // If we get here because a corruption occurred, and
    // CallContinuation( ) was used to return to this point
    // then the flag continuation_called will be
    // true.
    Boolean continuation_called = SetContinuationPoint( );
    if (!continuation_called){
        Call(code_to_protect);
        // check the integrity of the sandbox
        if(!CheckSandboxPattern(sanbox)){
            CorruptionOccurred( );
        }
        // we successfully called the function
        // and no corruption occurred
        // so we can throw away the continuation
        continuations.Get(tid).Pop( );
    }
    else{
        // corruption occurred so we call the
        // code_on_failure to perform cleanup actions
        Call(code_on_failure);
    }
}
function CorruptionOccurred( )
{
    // get the stored continuation
    ThreadID tid=GetThreadID( );
    Continuation cont;
    cont=continuations.Get(tid).Pop( );
    // resume to the continuation point (marked by *** above)
    CallContinuation(cont);
}
```

Irrespective of whether a fault was detected during execution of a protected software component 320, execution of the software system 300 may continue 450.

If no faults are detected this is a relatively straightforward process, and execution continues normally. If a fault is detected 430, however, the state may be restored, as described above, before execution of the software system 300 is resumed. Often times, resuming normal execution is problematic because the remainder of the software system 300 may expect the protected software component 320 to return a value or an exit code. While no return value or exit code whatsoever may be troublesome for the software system, most software systems are capable of dealing with a return value of false, indicating the called software component failed. Consequently, many embodiments of the present invention allow code 330 to be associated with a protected software component 320 such that upon detection of a fault in the protected software component 320, and before normal execution of the software system resumes, this remedial code can be executed to emulate a return value for the terminated protected software component 320. Usually, a return value of false is emulated. The failure of the protected software component can then be dealt with and execution of the software system may then resume normally.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for protecting a computer program comprising:
    designating a first software component of the computer program as protected; wherein the first software component comprises a series of instructions to be executed on a central processing unit (CPU);
    saving a state of the computer program before executing the first software component;
    associating a remedial software component with the first software component;
    executing the first software component;
    determining whether a fault occurred during execution of the first software components, wherein the fault is caused by one or more programming defects within the first software component; and
    if the fault is detected,
        terminating the execution of the first software component;
        restoring the computer program to the previously saved state; and
        executing the remedial software component.

2. The method of claim 1, further comprising:
    continuing execution of the computer program after restoring the computer program to the previously saved state and executing the remedial software component.

3. The method of claim 1, further comprising:
if no fault is detected,
  skipping execution of the remedial software component; and
  continuing execution of the computer program.

4. The method of claim 1, wherein:
execution of the remedial software component emulates a default return value for the first software component.

5. The method of claim 1, wherein:
the first software component comprises code implementing a nested software component and wherein the nested software component is designated as protected, further comprising:
maintaining a stack of states for every thread executing in the computer program.

6. The method of claim 1, further comprising:
detecting the fault by monitoring signals issued by the CPU in response to the series of instructions presented by the first software component.

7. The method of claim 1, further comprising:
detecting the fault through a comparison of patterns placed in a memory before and after the execution of the first software component.

8. The method of claim 1, further comprising:
detecting the fault by comparing time taken to execute the first software component with a predetermined time period.

9. The method of claim 1, wherein:
saving the state of the computer program comprises creating copies of a local memory stack, a function pointer stack, and a program counter.

10. The method of claim 1, wherein:
the computer program utilizes threads; and
the state is saved for each thread.

11. The method of claim 1, further comprising:
executing a second software component, wherein the second software component has been designated for protection; and
the first software component is nested within the second software component.

12. The method of claim 1, wherein
step of designating a first software component of the computer program as protected comprises surrounding the first software component with protective code to be run before the execution of the first software component.

13. A data processing system readable medium, comprising code containing instructions translatable for:
designating a first software component of a computer program as protected; wherein the first software component comprises a series of instructions to be executed on a central processing unit (CPU);
saving a state of the computer program before executing the first software component;
associating a remedial software component with the first software component;
executing the first software component;
determining whether a fault occurred during execution of the first software component, wherein the fault is caused by one or more programming defects within the first software component; and
if the fault is detected,
  terminating the execution of the first software component;
  restoring the computer program to the previously saved state; and
  executing the remedial software component.

14. The data processing system readable medium of claim 13, wherein the code further comprises instructions translatable for:
continuing execution of the computer program after restoring the computer program to the previously saved state and executing the remedial software component.

15. The data processing system readable medium of claim 13, wherein the code further comprises instructions translatable for:
if no fault is detected,
  skipping execution of the remedial software component; and
  continuing execution of the computer program.

16. The data processing system readable medium of claim 13, wherein the code further comprises instructions translatable for:
emulating a default return value for the first software component if the fault is detected.

17. The data processing system readable medium of claim 13, wherein:
the first software component comprises code implementing a nested software component and wherein the nested software component is designated as protected, further comprising:
maintaining a stack of states for every thread executing in the computer program.

18. The data processing system readable medium of claim 13, wherein the code further comprises instructions translatable for:
monitoring signals issued by the CPU in response to the series of instructions presented by the first software component.

19. The data processing system readable medium of claim 13, wherein the code further comprises instructions translatable for:
comparing patterns existing in a memory area before and after the execution of the first software component.

20. The data processing system readable medium of claim 13, wherein the code further comprises instructions translatable for:
detecting the fault by comparing time taken to execute the first software component with a predetermined time period.

21. The data processing system readable medium of claim 13, wherein the code further comprises instructions translatable for:
creating copies of a local memory stack, a function pointer stack, and a program counter.

22. The data processing system readable medium of claim 13, wherein
the computer program utilizes threads; and
the state is saved for every thread.

23. The data processing system readable medium of claim 13, wherein the code further comprises instructions translatable for:
executing a second software component, wherein the second software component has been designated for protection; and
the first software component is nested within the second software component.

24. The data processing system readable medium of claim 13, wherein the code further comprises instructions translatable for:
a protective code layer to be run before the execution of the first software component.

25. A system comprising:
a central processing unit (CPU); and
a software system having a plurality of discrete software components for performing a plurality of functions, wherein the plurality of discrete software components include
   a first software component comprising a series of instructions to be executed on the CPU; and
   a second software component associated with the first software component, wherein the second software component is to be run before the first software component and is configured to:
      save a state of the software system before execution of the first software component;
      determine if a fault occurs during the execution of the first software component, wherein the fault is caused by one or more programming defects within the first software component; and
      terminate the execution of the first software component, restore the software system to the previously saved state, and take remedial action if the fault occurs during execution of the first software component.

26. The system of claim 25, wherein:
the second software component is further configured to return a default value if the fault occurs during execution of the first software component.

27. The system of claim 25, wherein:
the software system is configured to continue executing after the state is restored and the remedial action is taken.

28. The system of claim 25 further comprising a third software component, wherein:
the third software component has been designated for protection; and
the first software component is nested within the third software component.

29. The system of claim 25, wherein:
the second software component determines if a fault occurs during the execution of the first software component using a memory pattern.

30. The system of claim 25, wherein:
the second software component determines if a fault occurs during the execution of the first software component by monitoring an execution time of the first software component.

31. A method for protecting a software system,
wherein said software system comprises lines of source code grouped into a plurality of software components, said method comprising:
configuring a first protective code layer for a first software component of said software system such that during execution of said software system on said computer system said first protective code layer is operable to
save a state of said software system before execution of said first software component;
detect whether a fault occurs during said execution of said first software component wherein the fault is caused by one or more programming defects within the first software component;
terminate said execution of said first software component upon detection of said fault; and
restore said software system to said state.

32. The method according to claim 31, further comprising:
configuring a first remedial software component, wherein said first protective code layer is further operable to associate said first remedial software component with said first software component such that, after said execution of said first software component is terminated, said first remedial software component is operable to take remedial action based on said fault.

33. The method according to claim 32, wherein said first remedial software component is operable to emulate a return value for said first software component.

34. The method according to claim 31, wherein said first protective code layer is operable to detect said fault by verifying a bit pattern in a memory area of said computer system.

35. The method according to claim 31, wherein said fault is an error that crashes said computer system or that impairs a functionality of said software system.

36. The method according to claim 31, further comprising designating said first software component for protection, wherein said first software component is operable to allocate memory or manipulate points to said memory.

37. The method according to claim 31, further comprising:
inserting a macro into said software system to designate a plurality of discrete software components of said software system for protection utilizing a programming library, wherein said programming library embodies said first protective code layer and wherein said plurality of discrete software components include said first software component.

38. A computer-readable medium carrying computer-executable instructions implementing a software system, wherein said software system comprises lines of source code grouped into a plurality of software components and wherein said computer-executable instructions comprise:
code for a first software component;
code a first protective code layer for said first software component wherein said first protective code layer is operable to
save a state of said software system before execution of said first software component on a computer system;
detect whether a fault occurs during said execution of said first software component wherein the fault is caused by one or more programming defects within the first software component;
terminate said execution of said first software component upon detection of said fault; and restore said software system to said state.

39. The computer-readable medium of claim 38, wherein said computer-executable instructions further comprise code for a first remedial software component and wherein said first protective code layer is further operable to associate said first remedial software component with said first software component such that, after said execution of said first software component is terminated, said first remedial software component is operable to take remedial action based on said fault.

40. The computer-readable medium of claim 39, wherein said first remedial software component is operable to emulate a return value for said first software component.

41. The computer-readable medium of claim 38, wherein said computer-executable instructions further comprise code for verifying a bit pattern in a memory area of said computer system.

42. The computer-readable medium of claim 38, wherein said computer-executable instructions further comprise code for designating said first software component for protection, wherein said first software component is operable to allocate memory or manipulate points to said memory.

43. The computer-readable medium of claim 38, wherein said computer-executable instructions further comprise
    code for implementing a programming library; and
    code for a macro to be inserted into said software system to designate a plurality of discrete software components of said software system for protection utilizing said programming library, wherein said programming library embodies said first protective code layer and wherein said plurality of discrete software components include said first software component.

* * * * *